United States Patent [19]

Sugiyama

[11] Patent Number: 4,968,338
[45] Date of Patent: Nov. 6, 1990

[54] INVERTER CONTROLLED AIR CONDITIONER WITH OPTIMUM DETERMINATION FOR OVER CURRENT DETECTION

[75] Inventor: Akiyoshi Sugiyama, Fuji, Japan

[73] Assignee: Kabushiki Kaisha Toshiba, Kawasaki, Japan

[21] Appl. No.: 469,372

[22] Filed: Jan. 24, 1990

[30] Foreign Application Priority Data

Feb. 10, 1989 [JP] Japan ................................ 1-31325

[51] Int. Cl.⁵ .............................................. F25B 1/00
[52] U.S. Cl. ...................................... 62/126; 62/230; 361/22
[58] Field of Search .............. 62/158, 230, 126, 228.4; 361/22

[56] References Cited

U.S. PATENT DOCUMENTS

| 4,724,680 | 2/1988 | Kawai | 62/228.4 X |
| 4,850,200 | 7/1989 | Sugiyama | 62/156 |

FOREIGN PATENT DOCUMENTS

| 0227849 | 7/1987 | European Pat. Off. | |
| 59-106882 | 6/1984 | Japan . | |
| 61-175429 | 8/1986 | Japan . | |
| 0223446 | 10/1986 | Japan | 62/228.4 |
| 2119591 | 11/1983 | United Kingdom . | |
| 2152308 | 7/1985 | United Kingdom . | |

Primary Examiner—William E. Wayner
Attorney, Agent, or Firm—Cushman, Darby & Cushman

[57] ABSTRACT

A memory stores, in advance, at least a first V/F pattern corresponding to an air conditioning load and having reference voltage and frequency characteristics, and a second V/F pattern having voltage and frequency characteristics lower than those of the first V/F pattern in a starting region of a variable-capacity compressor for driving a refrigeration cycle. A detector detects an over current supplied to an inverter for driving the compressor. A controller stops the compressor through the inverter when the detector detects the over current, and restarts or holds the compressor through the inverter in accordance with the detection count of the over current. The compressor is restarted with the first V/F pattern from the memory when the detection count is smaller than a first predetermined count, and when the detection count reaches a second predetermined count larger than the first predetermined count. The compressor is restarted with reading out the second V/F pattern from the memory while the detection count is larger than the first predetermined count and is smaller than the second predetermined count. The compressor is held when the detection count reaches a third predetermined count obtained by adding "1" to the second predetermined count, thereby confirming an abnormality of and allowing determination whether the abnormality occurs in the inverter or in the compressor.

15 Claims, 6 Drawing Sheets

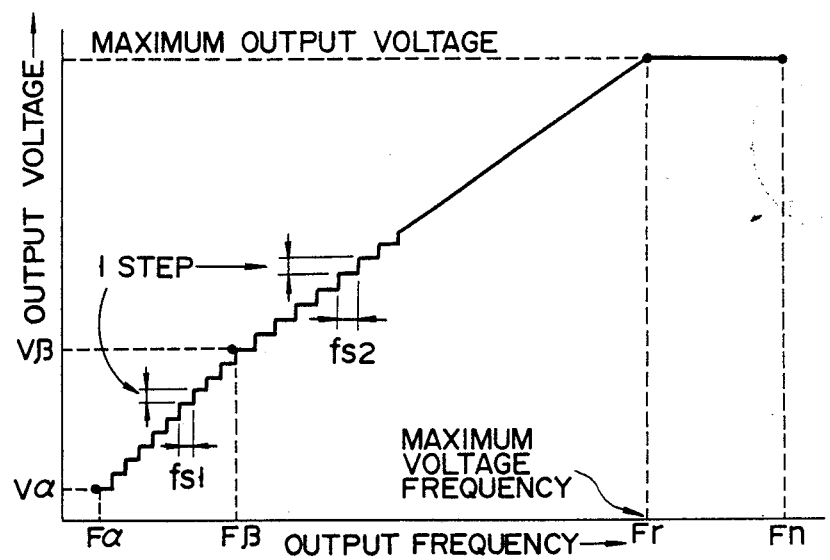
F I G. 5
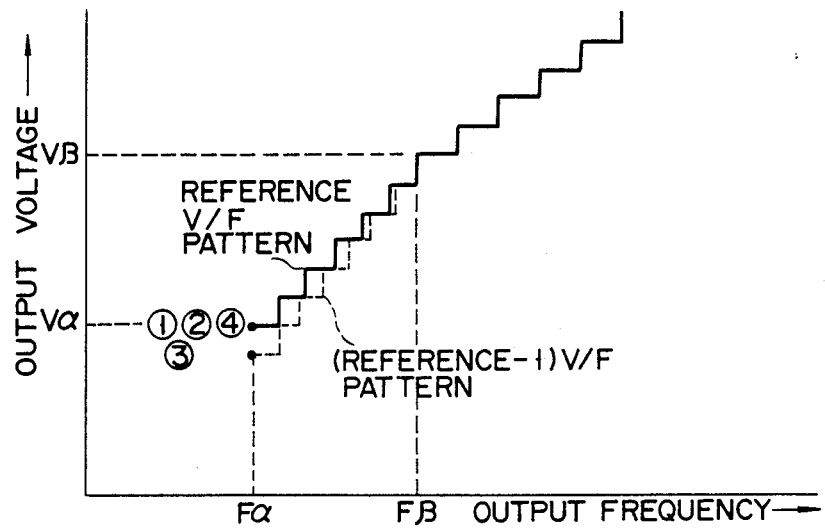
F I G. 6

INVERTER CONTROLLED AIR CONDITIONER WITH OPTIMUM DETERMINATION FOR OVER CURRENT DETECTION

BACKGROUND OF THE INVENTION

1. Field of the Invention

The present invention generally relates to an air conditioner and, more particularly, to an inverter controlled air conditioner with an over current detection.

2. Description of the Related Art

As is generally known, a conventional inverter controlled air conditioner includes an inverter drive section for supplying a V/F pattern output having a predetermined voltage and frequency corresponding to an air conditioning load from an inverter section to a variable-capacity compressor. The variable-capacity compressor can vary a capacity of circulating a refrigerant in a refrigeration cycle including external and internal heat-exchangers. The inverter drive section supplies a V/F pattern output having a low voltage and frequency to the variable-capacity compressor through the inverter section when a capacity required by the air conditioning load is low. In contrast to this, when a capacity required by the air conditioning load is high, the inverter drive section supplies a V/F pattern output having a high voltage and frequency.

In the above-mentioned inverter controlled air conditioner, assume that it is difficult to start the compressor due to a dead refrigerant (dissolved in a lubricating oil in the compressor) or a load of the refrigeration cycle, the compressor is locked, or the inverter section fails. In such a case, an over current is supplied to the inverter section. Therefore, an inverter controlled air conditioner, having a function for causing an over current detection section to detect the over current supplied to the inverter section, and causing the inverter drive section to protect the inverter section and equipments which constitute the refrigeration cycle, is conventionally used.

If the inverter drive section determines the presence of an abnormality upon only one detection of an over current, a determination error may occur. In order to prevent such an error, the inverter drive section conventionally executes an over current protection routine shown in a flow chart in FIG. 7. More specifically, as indicated by a solid line in FIG. 7, it is determined whether there is an input from the over current detector in step S1. If YES in step S1, the compressor is temporarily stopped (step S2). The number of inputs from the over current detector is counted to determine a predetermined count N =Nend (steps S3 and S4). When the input count from the over current detector reaches a predetermined count, i.e., N =Nend, an abnormality is determined, and the compressor is perfectly stopped (steps S5 and S6). When NO in step S4, i.e., the input count does not reach the predetermined count Nend, the compressor is restarted (step S7).

The above-mentioned control operation can be performed when the compressor is locked or the inverter section is failed. However, when it is difficult to start the compressor due to dissolution of the refrigerant or a load of the refrigeration cycle, the compressor may restart by itself. Therefore, if it is determined that an abnormality occurs and the compressor is perfectly stopped, inconveniences may occur.

As indicated by a broken line in FIG. 7, the air conditioner, in which the number of inputs from the over current detector is counted, a voltage and frequency supplied to the compressor are set to be a reference V/F pattern if $N < N_2$, i.e., YES in step S8, and the voltage and frequency supplied to the compressor are set to be a (reference—1 step) V/F pattern if NO in step S8, thus restarting the compressor (steps S9, S10, and S11), is also conventionally used.

In this case, however, the V/F pattern is varied in accordance with the number of inputs supplied from the over current detector again, as shown in FIG. 8. Therefore, characteristics of the over current as a function of time vary between time t1 and t2, and hence it is difficult to determine without an error whether an abnormality occurs in the inverter section or the compressor is locked, i.e., A or B.

As described above, the conventional inverter controlled air conditioner has the following drawback. Even if a starting operation is temporarily failed due to a variation in load of the refrigeration cycle, the compressor may be perfectly stopped, or a determination error of the abnormality in the inverter section or the compressor may occur. As a result, abnormality contents cannot be determined with reliability.

SUMMARY OF THE INVENTION

If is, therefore, an object of the present invention to provide a new and improved inverter controlled air conditioner with an optimum determination for an over current detection in which a starting failure of a refrigeration cycle is reduced, the air conditioner can be continuously driven, and its abnormality contents can be determined with reliability when an abnormality occurs, thus improving a service performance of the entire apparatus.

According to the present invention, there is provided an air conditioner comprising:

a variable-capacity compressor for varying a capacity to circulate a refrigerant in a refrigeration cycle;

an inverter circuit including rectifying means for rectifying an AC input, and inverter means for switching an output current from the rectifying means to supply a V/F pattern output having predetermined voltage and frequency characteristics to the variable-capacity compressor;

memory means for storing, in advance, at least a first V/F pattern corresponding to an air conditioning load and having reference voltage and frequency characteristics, and a second V/F pattern having voltage and frequency characteristics lower than those of the first V/F pattern in a starting region of the variable-capacity compressor;

over current detecting means for detecting an over current supplied to the inverter circuit;

control means for stopping the variable-capacity compressor through the inverter circuit when the over current detecting means detects the over current, and restarting or holding the variable-capacity compressor through the inverter circuit in accordance with the detection count of the over current, the variable-capacity compressor being restarted by reading out the first V/F pattern from the memory means when the detection count is smaller than a first predetermined count, and when the detection count reaches a second predetermined count larger than the first predetermined count, the variable-capacity compressor being restarted by reading out the second V/F pattern from the memory means while the detection count is larger than the first predetermined count and is smaller than the second predetermined count, the variable-capacity compressor being held when the detection count reaches a third predetermined count obtained by adding "1" to the second predetermined count, thereby confirming an abnormality of a air conditioner and allowing determination whether the abnormality occurs in the inverter circuit or in the variable-capacity compressor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a graph for explaining in detail the V/F pattern stored in the ROM shown in FIGS. 1 and 2;

FIG. 6 is a graph for explaining in detail the starting control operation according to the present invention;

DETAILED DESCRIPTION OF THE PREFERRED EMBODIMENT

An embodiment of the present invention will be described hereinafter with reference to the accompanying drawings.

Figure 1:
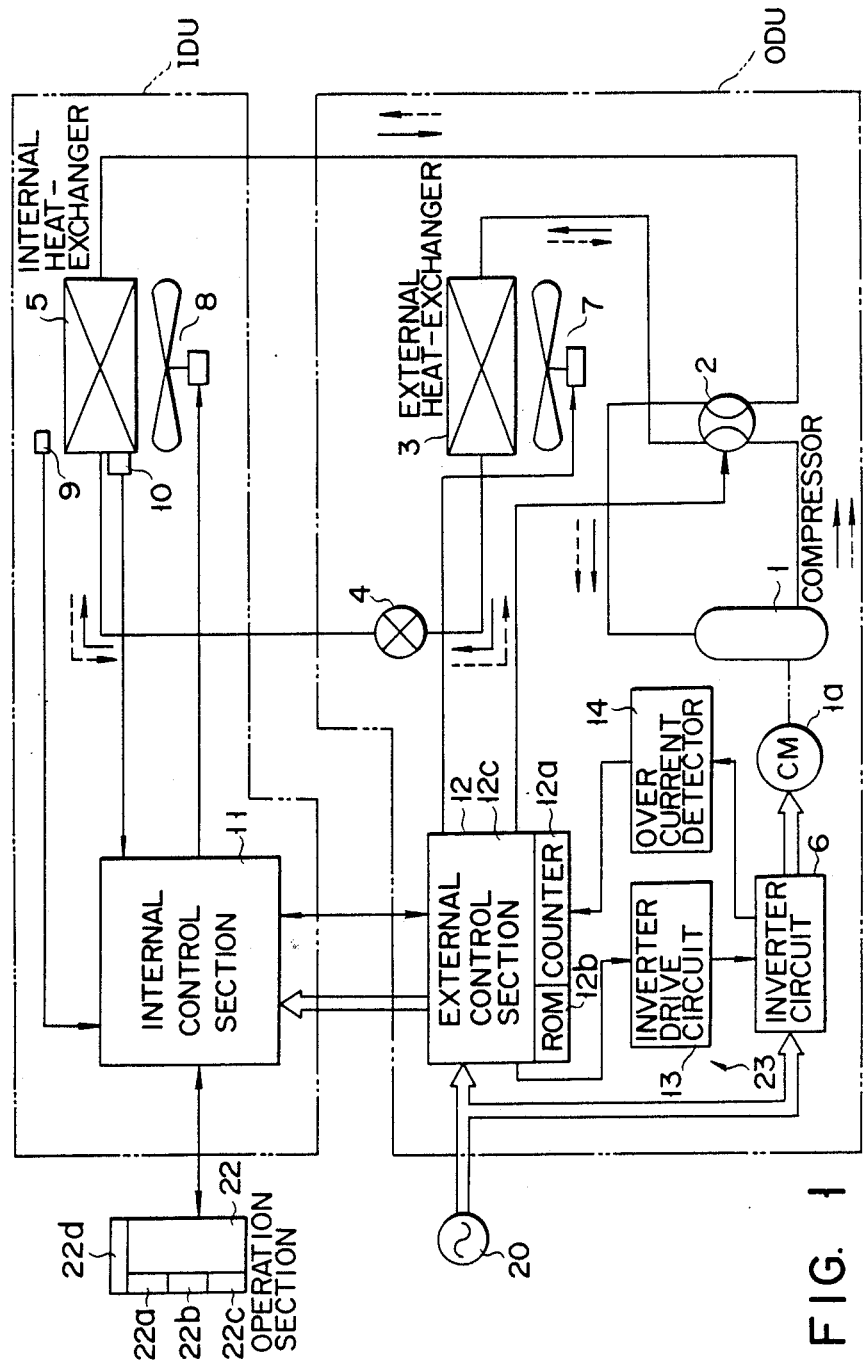
FIG. 1 is a block diagram showing an arrangement of a refrigeration cycle and a controller in an air conditioner according to an embodiment of the present invention.

In an air conditioner shown in FIG. 1, reference numeral 1 in an outdoor unit (ODU) denotes a variable-capacity compressor. The compressor 1 sequentially communicates a four-way valve 2, an external heat-exchanger 3, a pressure reducing unit, e.g., an expansion valve, 4, and an internal heat-exchanger 5 in an indoor unit (IDU), thus constituting a heat pump type refrigeration cycle.

In such an air conditioner, a refrigerant flows along a solid arrow in FIG. 1 to form a cooling cycle during a cooling operation, and the external and internal heat-exchangers 3 and 5 serve as a condenser and an evaporator, respectively.

On the other hand, during a heating operation, when the four-way valve 2 is switched, a refrigerant flows along a broken arrow in FIG. 1 to form a heating cycle, and the internal and external heat-exchangers 5 and 3 serve as a condenser and an evaporator, respectively.

The compressor 1 is driven by a compressor motor 1a which receives a V/F pattern output from an inverter circuit 6.

An external fan 7 is disposed near the external heat-exchanger 3.

An internal fan 8 and an internal temperature sensor (intake air temperature sensor) 9 are disposed near the internal heat-exchanger 5. A heat exchange temperature sensor 10 is arranged at the internal heat-exchanger 5.

During a cooling or heating operation, a V/F pattern output supplied from the inverter circuit 6 to a compressor motor 1a is controlled through internal and external control sections 11 and 12, and an inverter drive circuit 13 in accordance with a difference between a preset internal temperature and a temperature detected by the internal temperature sensor 9. Therefore, the compressor 1 obtains an optimum capacity corresponding to an air conditioning load to improve comfort of users and achieve an energy-saving effect as an air conditioner.

In this case, the external control section 12 performs the following determination and control operation in response to a detection output of an over current which is supplied to the inverter circuit 6 and is detected by an over current detector 14.

In FIG. 1, reference numeral 20 denotes a commercial AC power source. The inverter circuit 6 and the external control section 12 are connected to the power source 20.

The internal and external control sections 12 and 13 control the entire air conditioner, and mainly have a microcomputer and its periphery circuits. The four-way valve 2, the inverter circuit 6, and the external fan 7 are connected to the external control section 12. The internal fan 8, the internal temperature sensor 9, the heat exchange temperature sensor 10, and an operation section 22 are connected to the internal control section 11. The operation section 22 includes at least a cooling-/heating selection key 22a, an internal temperature setting key 22b, a start key 22c, and a display 22d.

Figure 4:
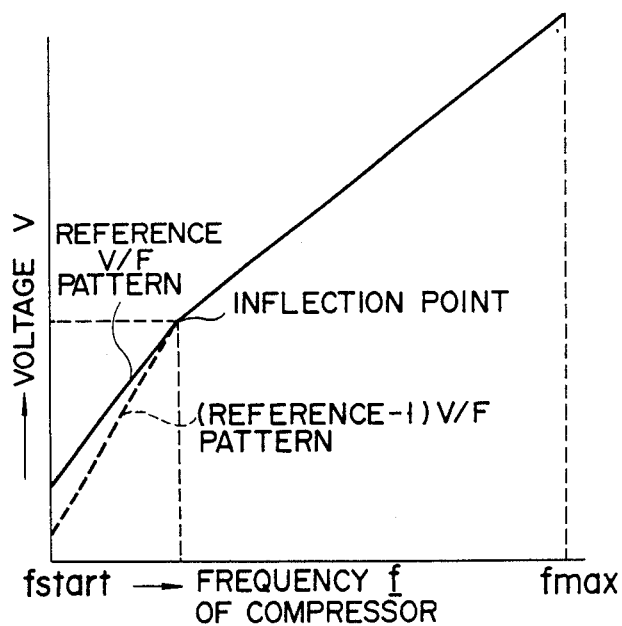
FIG. 4 is a graph showing schematic V/F patterns stored in a ROM shown in FIGS. 1 and 2.

Note that the external control section 12 includes a counter 12a for counting a detection output from the over current detector 14, a read-only memory (ROM) 12b for storing, as a plurality of V/F patterns, at least a reference V/F pattern and a (reference—1 step) V/F pattern obtained by reducing the step of the reference pattern by one in a starting region up to an inflection point in FIG. 4, and a determination control section 12c. As will be described later, the determination control section 12c determines a count output from the counter 12a, reads out a V/F pattern in accordance with the determination result from the ROM 12a, and supplies the pattern to the inverter drive circuit 13.

Figure 2:
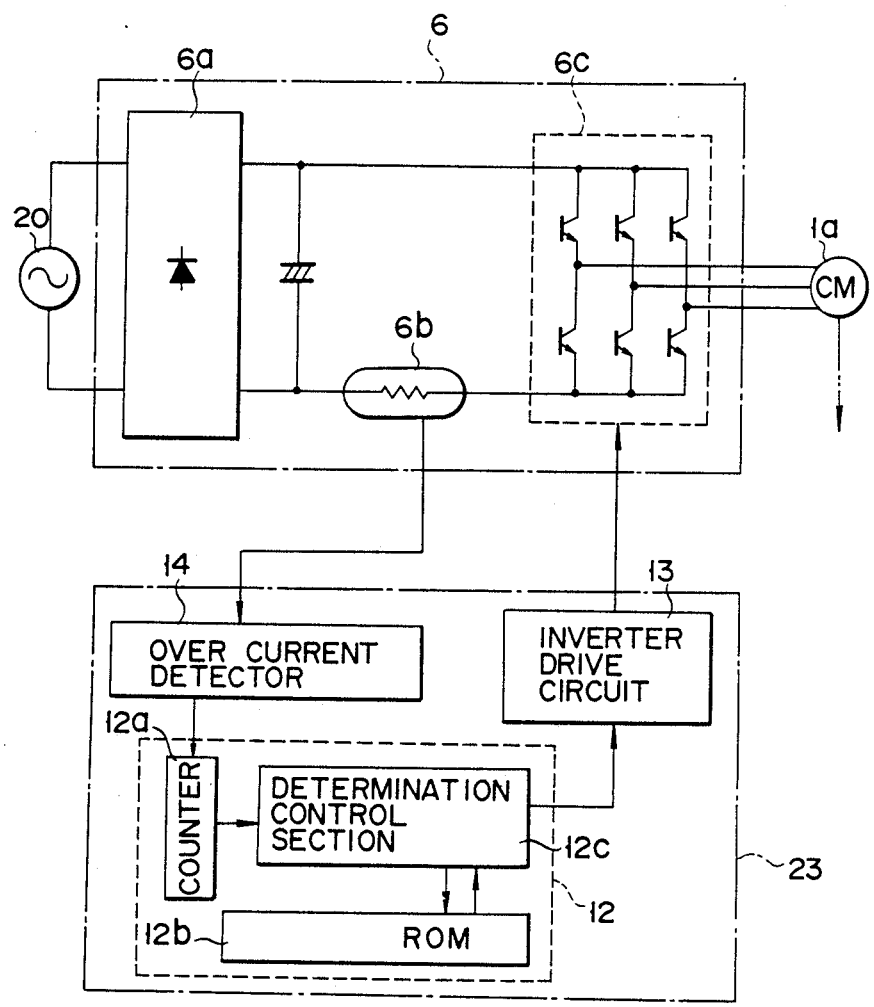
FIG. 2 is a circuit diagram showing a detailed arrangement of a main part of the controller shown in FIG. 1.

FIG. 2 shows a main part in the outdoor unit ODU in FIG. 1. Reference numeral 6 denotes an inverter circuit connected to the AC power source 20. The inverter circuit 6 includes a rectifier section 6a for rectifying an AC voltage from the AC power source 20, an over current detection section 6b consisting of an AC unit for detecting the rectified current, and an inverter section 6c having a transistor module for switching the rectified output to form a pseudo AC waveform and outputting the waveform. The compressor motor 1a is connected to the output terminal of the inverter section 6c to drive the variable-capacity compressor (to be referred to as a compressor 1 hereinafter).

Reference numeral 23 denotes an external unit controller. The external unit controller 23 includes the over current detector 14 for receiving a current detection signal detected by the over current detection section 6b, the external control section 12 including a microcomputer, and the inverter drive circuit 13. When the over current detector 14 detects an over current, an over current signal is output to the counter 12a in the external control section 12 includes the counter 12a as a counting means for counting the number of inputs of the over current detection signal, and the determination control section 12c serving as an over current protection and control means for determining a value counted by the counter 12a (to be described later), selecting a pattern in accordance with a determination result among a plurality of voltage/frequency (to be referred to as V/F hereinafter) patterns, stored in the ROM 12b in advance (as shown in FIG. 4), for driving the compressor motor 1a, and outputting the pattern to the drive circuit 13. The rectified current is switching-controlled in response to a drive signal output from the inverter drive circuit 13. An operation of the compressor 1 is variable-speed controlled in response to the switching-controlled output through the compressor motor 1a.

Figure 3:
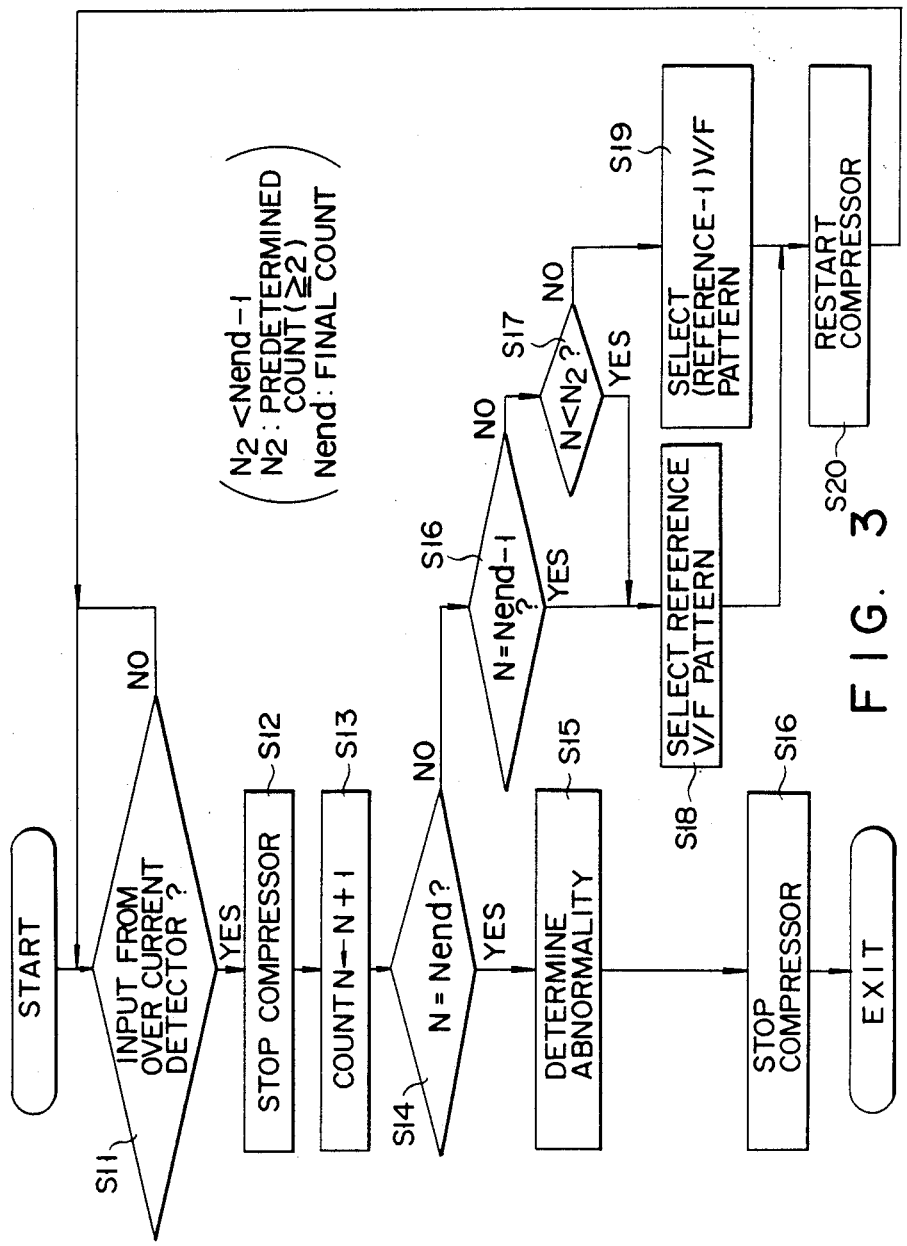
FIG. 3 is a flow chart for explaining a starting operation for the circuit shown in FIGS. 1 and 2.

An operation of the controller for the air conditioner with the above arrangement will be described hereinafter on the basis of the flow chart in FIG. 3.

When an over current supplied to the inverter section 6c through the over current detection section 6b is detected by the over current detector 14, the determination control section 12c stops the compressor motor 1a, i.e., the compressor 1, and causes the counter 12a to count the number of detections (steps S11 to S13). When a count N from the counter 12a is a final count (for abnormality determination) Nend, i.e., N = Nend, the determination control section 12c determines the presence of an abnormality to perfectly stop the compressor motor 1a (steps S14 to S16). When N≠Nend, as will be described below, the compressor motor 1a, i.e., the compressor 1, is restarted.

In order to restart the compressor 1a, i.e., the compressor 1, the following operations are required. When the count N from the counter 12a is equal to Nend—1, i.e., the count is less than a count (predetermined count) N2 which satisfies Nend—1>N2≧2 (where Nend is the final count), a reference V/F pattern is read out from the ROM 12b, thus starting the compressor 1 (steps S16 to S18). When N≧N2' a (reference—1 step) V/F pattern output, i.e., a V/F pattern obtained by reducing the step of the reference pattern by one (FIG. 4), is read out from the ROM 12b and output to the drive circuit 13 (step S19), thus restarting the compressor motor 1a, i.e., the compressor 1 (step S20).

Figure 8:
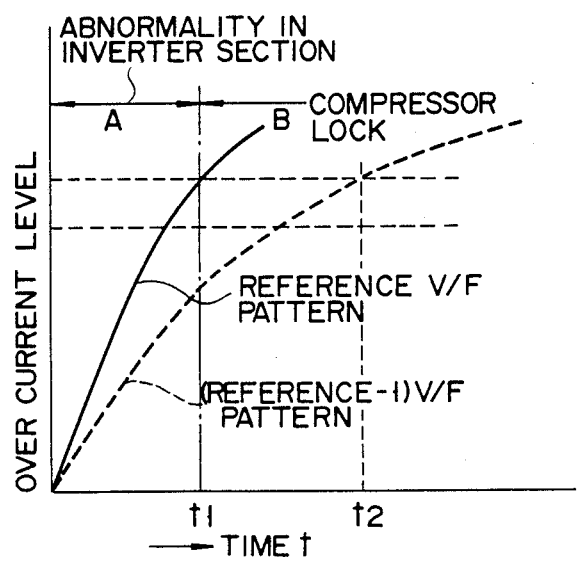
FIG. 8 is a graph for explaining characteristics of a rectified current as a function of time and failure parts in accordance with a difference in patterns of a voltage and frequency.
Figure 7:
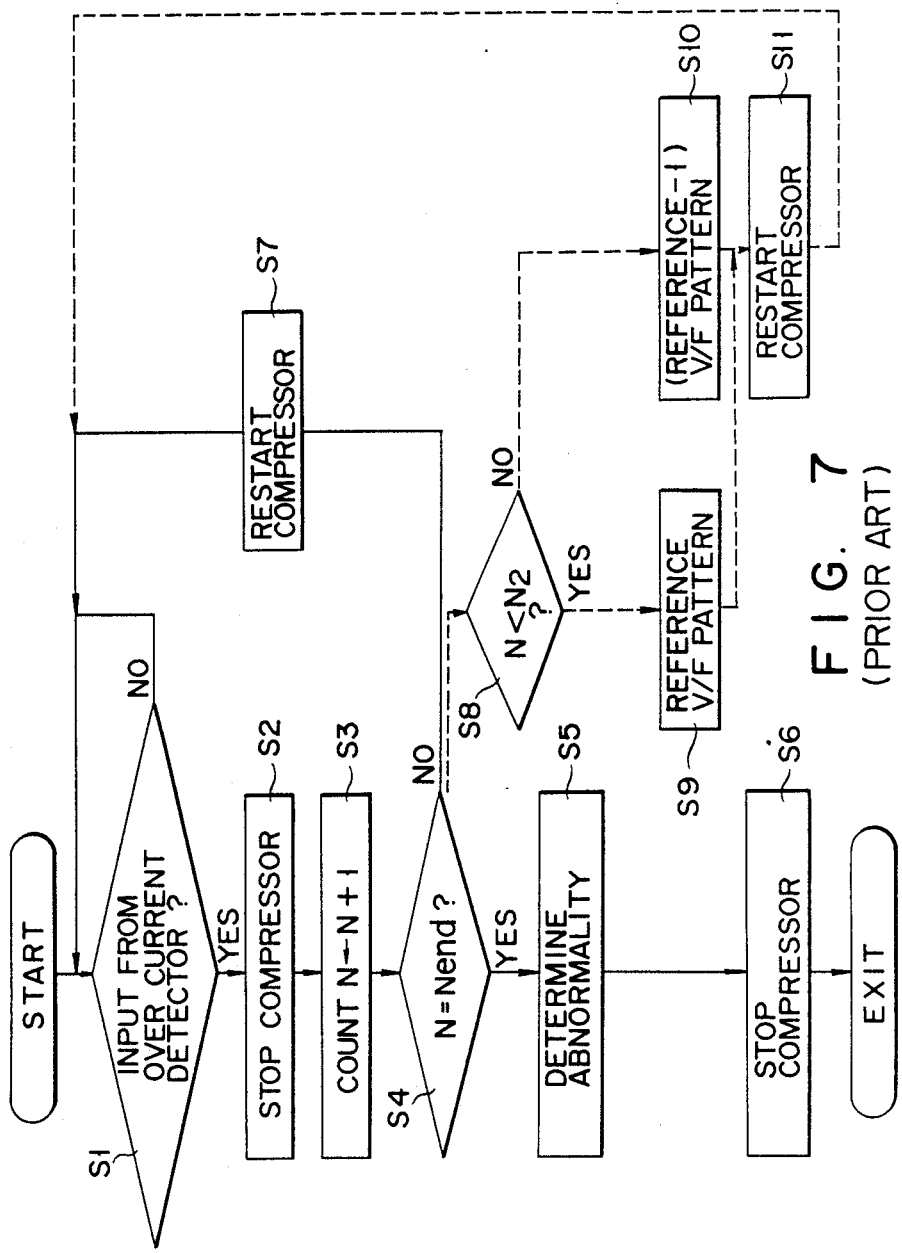
FIG. 7 is a flow chart for explaining a starting operation of a conventional air conditioner.

When the above control operation is performed, even if the over current detector 14 erroneously determines a transit change due to, e.g, noise as an over current detection upon, e.g., the first starting operation, at least one start try chance is left, thus continuously driving the air conditioner. In addition, even if it is difficult to start the compressor motor 1a, i.e., the compressor 1, due to a load of the refrigeration cycle (N≧2), the reference V/F pattern is step-reduced to the (reference—1 step) V/F pattern to suppress an increase in rectified current. Therefore, the compressor motor 1a, i.e., the compressor 1, can be started without a protecting operation. Furthermore, if an abnormality occurs in the inverter section 6c or the compressor 1 is locked, the V/F pattern read out from the ROM 12b is returned to the original reference V/F pattern upon a final start trying operation (N = Nend—1), so that it can be determined whether the abnormality occurs in the inverter section or the compressor (FIG. 8).

FIG. 5 is a graph showing the detailed V/F patterns in the above description. For example, the ROM 12b stores a total of 1,024 patterns including 4 patterns for a starting frequency (Fα), 16 patterns for a V/F inflection point (Fdα), 8 patterns for a gradient constant (fs1) below the inflection point, 8 patterns for and a gradient constant (fs2) above the inflection point.

FIG. 6 is a graph for explaining in detail the starting control in the above description. In accordance with operations of the over current detector 14 (to be denoted by reference symbol Idc hereinafter), the following control operations are performed by the determination control section 12c:

(1) A starting operation is tried up to four times.

(2) At this time, upon the first to third operations, when Idc is operated, the compressor is immediately stopped and the four-way valve is inverted. The compressor is restarted two minutes and twenty seconds after it is stopped.

(3) Starting operations at 1, 2, and 4 are performed in accordance with a reference V/F pattern, (4) At 3, a starting operation is performed in accordance with a (reference—1 step) V/F pattern if the Idc operations at 1 and 2 are less than a predetermined time elapsed, for example, t1 as shown in FIG. 8.

(5) When the Idc operation is performed at 4, the compressor is immediately stopped (abnormal stop). At this time, if the Idc operation is less than the predetermined time elapsed, "short-circuiting of the transistor in the inverter section 6c" is determined. If the Idc operation is equal to or more than the predetermined time elapsed, the "compressor lock" is determined.

As shown in FIG. 1, when the display 22d in the operation section 22 is ON/OFF-controlled by the external control section 12 through the internal control section 11 to be set in a predetermined state, these abnormalities are alarmed to a user or an instructor. In this case, the external control section 12 supplies a code signal to the internal control section 11 to discriminate that an abnormality is determined in the inverter circuit 6 or in the variable-capacity compressor 1.

Note that the air conditioner may have a function for resetting the counter 12a when no signal is output from the over current detector 14 for a predetermined period of time. In addition, in order to output the (reference—1 step) V/F pattern in accordance with the count, the second and third V/F patterns may be arranged besides the reference V/F pattern to perform a control operation, and the reference V/F pattern may be finally output.

As described above, according to the present invention, when an over current supplied to the inverter section is detected by the over current detector, the compressor is temporarily stopped, and the number of detections is counted. When this number coincides with a final count, an "abnormality" is determined to perfectly stop the compressor. When the count does not coincide with the final count, the compressor is restarted. Upon restarting, a frequency and voltage for driving the compressor are decreased as compared with the reference V/F pattern after the predetermined count is counted, and finally, the original reference V/F pattern is used, thus restarting the compressor. Therefore, a load starting failure of the refrigeration cycle can be reduced, and the air conditioner can be continuously driven. In addition, when the inverter section or the compressor fails, the failure contents can be determined, thus effectively improving a service performance.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. An air conditioner comprising:
    a variable-capacity compressor for varying a capacity to circulate a refrigerant in a refrigeration cycle;
    an inverter circuit including rectifying means for rectifying an AC input, and inverter means for switching an output current from said rectifying means to supply a V/F pattern having predetermined voltage and frequency characteristics to said variable-capacity compressor;
    memory means for storing, in advance, at least a first V/F pattern corresponding to an air conditioning load and having reference voltage and frequency characteristics, and a second V/F pattern having voltage and frequency characteristics lower than those of said first V/F pattern in a starting region of said variable-capacity compressor;
    over current detecting means for detecting an over current supplied to said inverter circuit;
    control means for stopping said variable-capacity compressor through said inverter circuit when said over current detecting means detects the over current, and restarting or holding said variable-capacity compressor through said inverter circuit in accordance with the detection count of the over current, said variable-capacity compressor being restarted by reading out said first V/F pattern from said memory means when the detection count is smaller than a first predetermined count, and when the detection count reaches a second predetermined count larger than the first predetermined count, said variable-capacity compressor being restarted by reading out said second V/F pattern from said memory means while the detection count is larger than the first predetermined count and is smaller than the second predetermined count, said variable-capacity compressor being held when the detection count reaches a third predetermined detection count obtained by adding "1" to the second predetermined count, thereby confirming an abnormality of said air conditioner and allowing determination whether the abnormality occurs in said inverter circuit or in said variable-capacity compressor.

2. An air conditioner according to claim 1, wherein said inverter means includes a transistor module for switching an output current from said rectifying means to output a pseudo AC waveform.

3. An air conditioner according to claim 1, wherein said over current detecting means includes a current transformer for detecting an output current from said rectifying means.

4. An air conditioner according to claim 1, wherein said memory means includes a ROM for storing data of a starting frequency, a V/F inflection point, a gradient constant below the inflection point, and a gradient constant above the inflection point, as a predetermined number of patterns, respectively.

5. An air conditioner according to claim 4, wherein the data of the starting frequency includes four patterns.

6. An air conditioner according to claim 4, wherein the data of the V/F inflection point includes sixteen patterns.

7. An air conditioner according to claim 4, wherein the gradient constant below the inflection point includes eight patterns.

8. An air conditioner according to claim 4, wherein the gradient constant above the inflection point includes eight patterns.

9. An air conditioner according to claim 4, wherein said control means allows four tries of the restarting operation.

10. An air conditioner according to claim 9, wherein the first to third restarting operations are performed two minutes and twenty seconds after a holding state of said compressor is set.

11. An air conditioner according to claim 9, wherein the first, second, and fourth restarting operations are performed by reading out said first pattern from said memory means.

12. An air conditioner according to claim 9, wherein the third restarting operation is performed by reading out said second pattern from said memory means.

13. An air conditioner according to claim 9, wherein when said over current detecting means detects an over current after the fourth restarting operation is performed, said control means determines that an abnormality occurs in said inverter circuit if the over current is detected before a predetermined time elapsed, and said control means determines that an abnormality occurs in said variable-capacity compressor if the over current is detected after the predetermined time elapsed.

14. An air conditioner according to claim 1, wherein said air conditioner further comprises display means for displaying a determination result of the abnormality determined by said control means.

15. An air conditioner according to claim 14, wherein said control means outputs a code signal, the code signal which is output when an abnormality of said inverter circuit is determined being different from the code signal which is output when an abnormality of said variable-capacity compressor is determined.

* * * * *